United States Patent
Strauser et al.

(10) Patent No.: US 7,523,606 B2
(45) Date of Patent: Apr. 28, 2009

(54) PARASITIC LOAD CONTROL SYSTEM FOR EXHAUST TEMPERATURE CONTROL

(75) Inventors: Aaron D. Strauser, Washington, IL (US); Gerald N. Coleman, Peterborough (GB); Dana R. Coldren, Fairbury, IL (US)

(73) Assignee: Caterpillar Inc., Peoria, IL (US)

( * ) Notice: Subject to any disclaimer, the term of this patent is extended or adjusted under 35 U.S.C. 154(b) by 559 days.

(21) Appl. No.: 11/214,955

(22) Filed: Aug. 31, 2005

(65) Prior Publication Data
US 2007/0044453 A1    Mar. 1, 2007

(51) Int. Cl.
*F01N 3/00* (2006.01)
(52) U.S. Cl. .............................. 60/300; 60/274; 60/285; 60/297; 60/311
(58) Field of Classification Search .................. 60/286, 60/295, 297, 311, 274, 285, 300
See application file for complete search history.

(56) References Cited

U.S. PATENT DOCUMENTS

| | | | |
|---|---|---|---|
| 4,565,065 A | 1/1986 | Kimura et al. | |
| 5,287,698 A | 2/1994 | Shinzawa et al. | |
| 5,357,929 A * | 10/1994 | McCandless | 123/446 |
| 5,826,425 A | 10/1998 | Rossi Sebastiano et al. | |
| 6,079,204 A | 6/2000 | Sun et al. | |
| 6,119,664 A * | 9/2000 | McCandless | 123/527 |
| 6,422,001 B1 | 7/2002 | Sherman et al. | |
| 6,457,453 B1 * | 10/2002 | Tanabe et al. | 123/300 |
| 6,516,609 B2 | 2/2003 | Igarashi et al. | |
| 6,536,209 B2 | 3/2003 | Fluga et al. | |

(Continued)

FOREIGN PATENT DOCUMENTS

EP    1319812    6/2003

(Continued)

OTHER PUBLICATIONS

Centi, "Selective Catalytic Reduction (SCR) Processes on Metal Oxides," 3$^{rd}$ EFCATS School on Catalysis, Ustron, Poland, Sep. 22, 2004, pp. 11-12.

*Primary Examiner*—Thomas E Denion
*Assistant Examiner*—Diem Tran
(74) *Attorney, Agent, or Firm*—Finnegan, Henderson, Farabow, Garrett & Dunner

(57) ABSTRACT

A parasitic load control system is provided. The system may include an exhaust producing engine and a fuel pumping mechanism configured to pressurize fuel in a pressure chamber. The system may also include an injection valve configured to cause fuel pressure to build within the pressure chamber when in a first position and allow injection of fuel from the pressure chamber into one or more combustion chambers of the engine when in a second position. The system may further include a controller configured to independently regulate the pressure in the pressure chamber and the injection of fuel into the one or more combustion chambers, to increase a load on the fuel pumping mechanism, increasing parasitic load on the engine, thereby increasing a temperature of the exhaust produced by the engine.

44 Claims, 7 Drawing Sheets

U.S. PATENT DOCUMENTS

| | | |
|---|---|---|
| 6,594,990 B2 | 7/2003 | Kuenstler et al. |
| 6,672,050 B2 | 1/2004 | Murata et al. |
| 6,802,180 B2 | 10/2004 | Gabe et al. |
| 6,840,224 B2 * | 1/2005 | Tanabe et al. ............... 123/458 |
| 6,865,883 B2 * | 3/2005 | Gomulka ..................... 60/295 |
| 7,143,576 B2 * | 12/2006 | Oono ........................... 60/285 |
| 2004/0172935 A1 | 9/2004 | Otake et al. |
| 2004/0237513 A1 | 12/2004 | Bunting et al. |

FOREIGN PATENT DOCUMENTS

| | | |
|---|---|---|
| GB | 2344059 | 5/2000 |
| JP | 63-297722 | 12/1988 |

\* cited by examiner

PARASITIC LOAD CONTROL SYSTEM FOR EXHAUST TEMPERATURE CONTROL

U.S. GOVERNMENT RIGHTS

The embodiments disclosed in this application were made with government support under the terms of DOE Award No. DE-FC05-97OR22605 awarded by the Department of Energy. The government may have certain rights in the embodiments disclosed in this application.

TECHNICAL FIELD

The present disclosure is directed to a parasitic load control system and, more particularly, to a parasitic load control system for controlling engine exhaust temperature.

BACKGROUND

Engines, including diesel engines, gasoline engines, natural gas engines, and other engines known in the art, may exhaust a complex mixture of air pollutants. The air pollutants may be composed of both gaseous and solid material, such as, for example, particulate matter. Particulate matter may include ash and unburned carbon particles called soot.

Due to increased environmental concerns, exhaust emission standards have become more stringent. The amount of particulate matter and gaseous pollutants emitted from an engine may be regulated depending on the type, size, and/or class of engine. In order to meet these emissions standards, engine manufacturers have pursued improvements in several different engine technologies, such as fuel injection, engine management, and air induction, to name a few.

In addition, engine manufacturers have developed devices for treatment of engine exhaust after it leaves the engine. For example, engine manufacturers have employed exhaust treatment devices called particulate traps to remove the particulate matter from the exhaust flow of an engine. A particulate trap may include a filter designed to trap particulate matter. The use of the particulate trap for extended periods of time, however, may enable particulate matter to accumulate on the filter, thereby causing damage to the filter and/or a decline in engine performance.

One method of restoring the performance of a particulate trap may include regeneration. Regeneration of a particulate trap filter system may be accomplished by thermal regeneration, which may include increasing the temperature of the filter and the trapped particulate matter above the combustion temperature of the particulate matter, thereby burning away the collected particulate matter and regenerating the filter system. This increase in temperature may be effectuated by various means. For example, some systems employ a heating element (e.g., an electric heating element) to directly heat one or more portions of the particulate trap (e.g., the filter material or the external housing). Other systems have been configured to heat the exhaust gases upstream from the particulate trap, allowing the flow of the heated gases through the particulate trap to transfer heat to the particulate trap. For example, some systems may heat the exhaust gases upstream from the particulate trap, with the use of a burner that creates a flame within the exhaust conduit leading to the particulate trap. Other systems may alter one or more engine operating parameters, such as air/fuel mixture, to produce exhaust gases with an elevated temperature. Running an engine with a "richer" air/fuel mixture can elevate exhaust gas temperature. Some systems may increase a parasitic load on the engine, while maintaining a constant engine speed. In order to do so, additional fuel may be injected, resulting in a richer air/fuel ratio and raising the exhaust gas temperatures.

Regeneration may be performed periodically as opposed to constantly. That is, after a trigger condition occurs, the thermal regeneration system may initiate regeneration in response to the trigger condition. Some systems are configured to elevate exhaust gas temperatures by increasing parasitic load on the engine. For example, one such regeneration system is disclosed by U.S. Patent Application Publication No. 2004/0172935 by Otake et al., published on Sep. 9, 2004 ("Otake et al."). Otake et al. disclose increasing the load of auxiliary devices, such as an air-conditioner compressor.

While the Otake et al. system may be configured to elevate exhaust gas temperatures by increasing parasitic load on the engine, the Otake et al. system achieves such an increase in load by also increasing engine speed.

Further, the Otake et al. system requires the presence of auxiliary devices to elevate exhaust gas temperatures. Engines may provide power for many different kinds of equipment, including stationary equipment or other kinds of unmanned equipment, such as electric power generation sets. Unmanned equipment would not be equipped with an air conditioner. Therefore, the Otake et al. system could not be implemented on such equipment.

The present disclosure is directed to solving one or more of the problems discussed above.

SUMMARY OF THE INVENTION

In one aspect, the present disclosure is directed to a parasitic load control system. The system may include an exhaust producing engine and a fuel pumping mechanism configured to pressurize fuel in a pressure chamber. The system may also include an injection valve configured to cause fuel pressure to build within the pressure chamber when in a first position and allow injection of fuel from the pressure chamber into one or more combustion chambers of the engine when in a second position. The system may further include a controller configured to independently regulate the pressure in the pressure chamber and the injection of fuel into the one or more combustion chambers, to increase a load on the fuel pumping mechanism, increasing parasitic load on the engine, thereby. increasing a temperature of the exhaust produced by the engine.

In another aspect, the present disclosure is directed to a method of controlling parasitic load on an exhaust producing engine. The method may include pressurizing fuel in a pressure chamber. The method may also include independently regulating the pressure in the pressure chamber and the injection of fuel into one or more combustion chambers of the engine to increase a load on a fuel pumping mechanism. The increase in load on the fuel pumping mechanism may cause an increase in parasitic load on the engine, thereby increasing a temperature of the exhaust produced by the engine.

DETAILED DESCRIPTION

Reference will now be made in detail to the drawings. Wherever possible, the same reference numbers will be used throughout the drawings to refer to the same or like parts.

Figure 1:
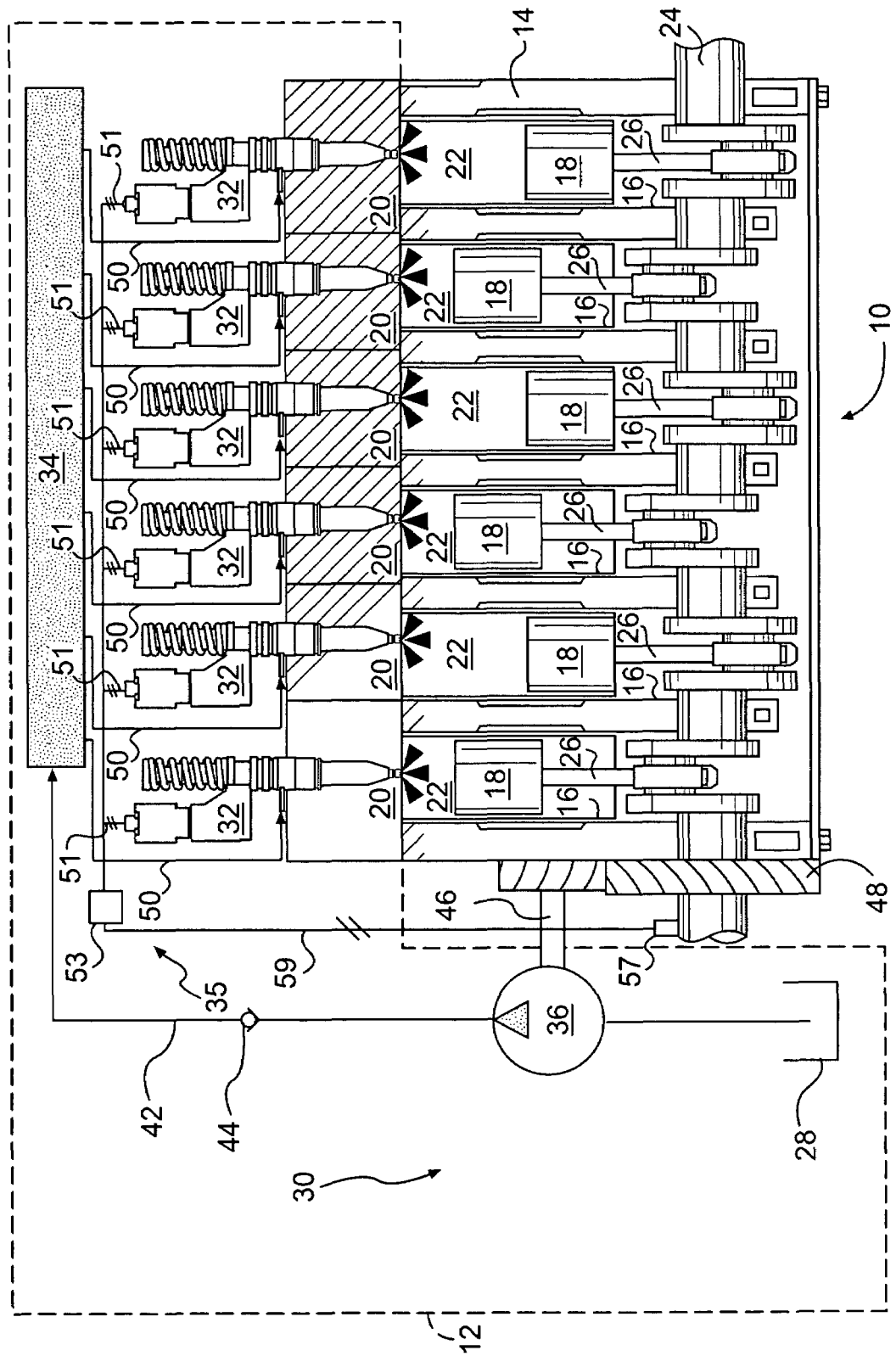
FIG. 1 is a schematic and diagrammatic illustration of an exemplary disclosed fuel system.

FIG. 1 illustrates an engine 10 and an exemplary embodiment of a fuel system 12. For the purposes of this disclosure, engine 10 is depicted and described as a four-stroke diesel engine. One skilled in the art will recognize, however, that engine 10 may be any other type of internal combustion engine such as, for example, a gasoline or a gaseous fuel-powered engine. Engine 10 may include an engine block 14 that defines a plurality of cylinders 16, a piston 18 slidably disposed within each cylinder 16, and a cylinder head 20 associated with each cylinder 16.

Cylinder 16, piston 18, and cylinder head 20 may form a combustion chamber 22. In the illustrated embodiment, engine 10 includes six combustion chambers 22. However, it is contemplated that engine 10 may include a greater or lesser number of combustion chambers 22 and that combustion chambers 22 may be disposed in an "in-line" configuration, a "V" configuration, or any other suitable configuration.

As also shown in FIG. 1, engine 10 may include a crankshaft 24 that is rotatably disposed within engine block 14. A connecting rod 26 may connect each piston 18 to crankshaft 24 so that a sliding motion of piston 18 within each respective cylinder 16 results in a rotation of crankshaft 24. Similarly, a rotation of crankshaft 24 may result in a sliding motion of piston 18.

Fuel system 12 may include components that cooperate to deliver injections of pressurized fuel into each combustion chamber 22. Specifically, fuel system 12 may include a tank 28 configured to hold a supply of fuel, a fuel pumping arrangement 30 configured to pressurize the fuel and direct the pressurized fuel to a plurality of fuel injectors 32 by way of a manifold 34, and a control system 35.

Fuel pumping arrangement 30 may include one or more pumping devices that function to increase the pressure of the fuel and direct one or more pressurized streams of fuel to manifold 34. In one example, fuel pumping arrangement 30 includes a low pressure source 36. Low pressure source 36 may embody a transfer pump configured to provide low pressure feed to manifold 34 via a fuel line 42. A check valve 44 may be disposed within fuel line 42 to provide for one-directional flow of fuel from fuel pumping arrangement 30 to manifold 34. It is contemplated that fuel pumping arrangement 30 may include additional and/or different components than those listed above such as, for example, a high pressure source disposed in series with low pressure source 36.

Low pressure source 36 may be operably connected to engine 10 and driven by crankshaft 24. Low pressure source 36 may be connected with crankshaft 24 in any manner readily apparent to one skilled in the art where a rotation of crankshaft 24 will result in a corresponding rotation of a pump drive shaft. For example, a pump driveshaft 46 of low pressure source 36 is shown in FIG. 1 as being connected to crankshaft 24 through a gear train 48. It is contemplated, however, that low pressure source 36 may alternatively be driven electrically, hydraulically, pneumatically, or in any other appropriate manner.

Fuel injectors 32 may be disposed within cylinder heads 20 and connected to manifold 34 by way of a plurality of fuel lines 50. Each fuel injector 32 may be operable to inject an amount of pressurized fuel into an associated combustion chamber 22 at predetermined timings, fuel pressures, and quantities. The timing of fuel injection into combustion chamber 22 may be synchronized with the motion of piston 18. For example, fuel may be injected as piston 18 nears a top-dead-center position in a compression stroke to allow for compression-ignited-combustion of the injected fuel. Alternatively, fuel may be injected as piston 18 begins the compression stroke heading towards a top-dead-center position for homogenous charge compression ignition operation. Fuel may also be injected as piston 18 is moving from a top-dead-center position towards a bottom-dead-center position during an expansion stroke for a late post-injection to create a reducing atmosphere for after-treatment regeneration. In order to accomplish these specific injection events, engine 10 may request an injection of fuel from control system 35 at a specific start of injection (SOI) timing, a specific start of injection pressure, a specific end of injection (EOI) pressure, and/or may request a specific quantity of injected fuel.

Control system 35 may control operation of each fuel injector 32 in response to one or more inputs. In particular, control system 35 may include a controller 53 that communicates with fuel injectors 32 by way of a plurality of communication lines 51 and with a sensor 57 by way of a communication line 59. Controller 53 may be configured to control a fuel injection timing, pressure, and amount by applying a determined current waveform or sequence of determined current waveforms to each fuel injector 32 based on input from sensor 57.

The timing of the applied current wave form or sequence of waveforms may be facilitated by monitoring an angular position of crankshaft 24 via sensor 57. In particular, sensor 57 may embody a magnetic pickup-type sensor configured to sense an angular position, velocity, and/or acceleration of crankshaft 24. From the sensed angular information of crankshaft 24 and known geometric relationships, controller 53 may be able to calculate the position of one or more components of fuel injector 32 that are operably driven by crankshaft 24 and thereby control the injection timing, pressure, and quantity as a function of the calculated position.

Controller 53 may embody a single microprocessor or multiple microprocessors that include a means for controlling an operation of fuel injector 32. Numerous commercially available microprocessors can be configured to perform the functions of controller 53. It should be appreciated that controller 53 could readily embody a general work machine or engine microprocessor capable of controlling numerous work machine or engine functions. Controller 53 may include all the components required to run an application such as, for example, a memory, a secondary storage device, and a processor, such as a central processing unit or any other means known in the art for controlling fuel injectors 32. Various other known circuits may be associated with controller 53, including power supply circuitry, signal-conditioning circuitry, solenoid driver circuitry, communication circuitry, and other appropriate circuitry.

Fuel system 12 may include any fuel injection system capable of independently controlling pressure and injection of fuel. For example, fuel system 12 may include a common rail system. In some embodiments, the common rail system may be hydraulically driven and, in some cases, amplified. Fuel system 12 could also include hydraulically actuated electronic unit injectors. Alternatively, fuel system 12 may include a mechanically actuated electronic unit injector.

Figure 2:
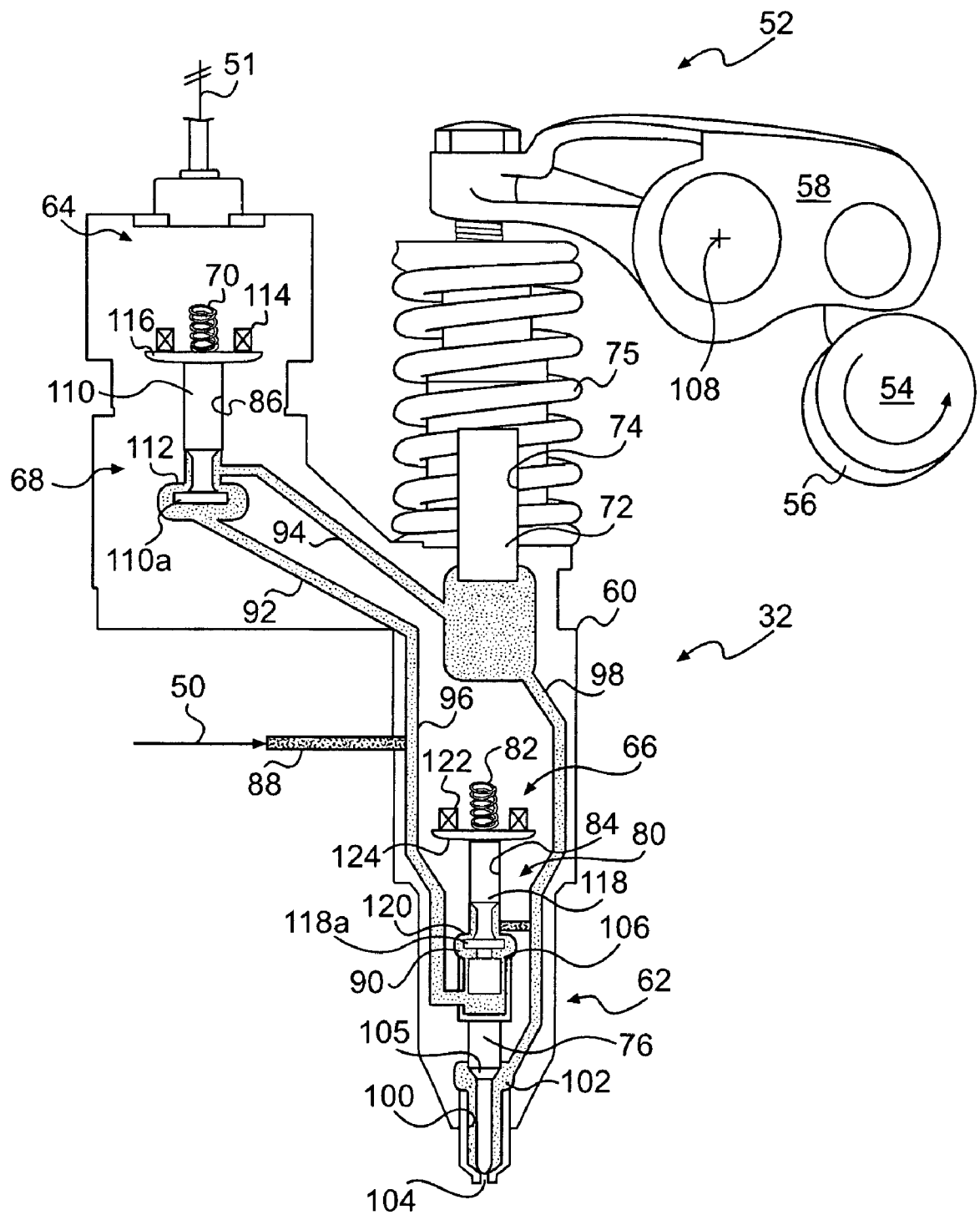
FIGS. 2 is a cut-away view illustration of an exemplary disclosed fuel injector for the fuel system of FIG. 1.

Although fuel system 12 may include a variety of different types of injection systems (as described above), for ease of discussion, this disclosure will illustrate and describe a system that employs mechanically actuated electronic unit injectors. As illustrated in FIG. 2, each fuel injector 32 may embody a mechanically-operated pump-type unit fuel injector. For example, each fuel injector may be driven by a cam arrangement 52 to selectively pressurize fuel within fuel injector 32 to a desired pressure level. Cam arrangement 52 may include a cam 54 operably connected to crankshaft 24 such that a rotation of crankshaft 24 results in a corresponding rotation of cam 54. For example, cam arrangement 52 may be connected with crankshaft 24 through a gear train (not shown), through a chain and sprocket arrangement (not shown), or in any other suitable manner. As will be described in greater detail below, during rotation of cam 54, a lobe 56 of cam 54 may periodically drive a pumping action of fuel injector 32 via a pivoting rocker arm 58. It is contemplated that the pumping action of fuel injector 32 may alternatively be driven directly by lobe 56 without the use of rocker arm 58, or that a pushrod (not shown) may be disposed between rocker arm 58 and fuel injector 32.

Fuel injector 32 may include multiple components that interact to pressurize and inject fuel into combustion chamber 22 of engine 10 in response to the driving motion of cam arrangement 52. In particular, each fuel injector 32 may include an injector body 60 having a nozzle portion 62, a plunger 72 disposed within a bore 74 of injector body 60, a plunger spring 75, a valve needle 76, a valve needle spring (not shown), a spill valve 68, a spill valve spring 70, a first electrical actuator 64, a direct operated check (DOC) valve 80, a DOC spring 82, and a second electrical actuator 66. It is contemplated that additional or different components may be included within fuel injector 32 such as, for example, restricted orifices, pressure-balancing passageways, accumulators, and other injector components known in the art.

Injector body 60 may embody a generally cylindrical member configured for assembly within cylinder head 20 and having one or more passageways. Specifically, injector body 60 may include bore 74 configured to receive plunger 72, a bore 84 configured to receive DOC valve 80, a bore 86. configured to receive spill valve 68, and a control chamber 90. Injector body 60 may also include a fuel supply/return line 88 in communication with bores 86, 74, 84, control chamber 90, and nozzle portion 62 via fluid passageways 92, 94, 96, and 98, respectively. Control chamber 90 may be in direct communication with valve needle 76 and selectively drained of or supplied with pressurized fuel to affect motion of valve needle 76. It is contemplated that injector body 60 may alternatively embody a multi-member element having one or more housing members, one or more guide members, and any other suitable number and/or type of structural members.

Nozzle portion 62 may likewise embody a cylindrical member having a central bore 100 and a pressure chamber 102. Central bore 100 may be configured to receive valve needle 76. Pressure chamber 102 may hold pressurized fuel supplied from fluid passageway 98 in anticipation of an injection event. Nozzle portion 62 may also include one or more orifices 104 to allow the pressurized fuel to flow from pressure chamber 102 through central bore 100 into combustion chambers 22 of engine 10.

Plunger 72 may be slidingly disposed within bore 74 and movable by rocker arm 58 to pressurize fuel within bore 74. Specifically, as lobe 56 pivots rocker arm 58 about a pivot point 108, an end of rocker arm 58 opposite lobe 56 may urge plunger 72 against the bias of plunger spring 75 into bore 74, thereby displacing and pressurizing the fuel within bore 74.

The fuel pressurized by plunger 72 may be selectively directed through fluid passageways 92-98 to spill valve 68, DOC valve 80, control chamber 90, supply/return line 88, and pressure chamber 102 associated with valve needle 76. As lobe 56 rotates away from rocker arm 58, plunger spring 75 may return plunger 72 upward out of bore 74, thereby drawing fuel back into bore 74.

Valve needle 76 may be an elongated cylindrical member that is slidingly disposed within central bore 100 of nozzle portion 62. Valve needle 76 may be axially movable between a first position at which a tip end of valve needle 76 blocks a flow of fuel through orifice 104, and a second position at which orifice 104 is open to allow a flow of fuel into combustion chamber 22. It is contemplated that valve needle 76 may be a multi-member element having a needle member and a piston member, or a single integral element.

Valve needle 76 may have multiple driving hydraulic surfaces. For example, valve needle 76 may include a hydraulic surface 105 that opposes the bias of the valve needle spring to drive valve needle 76 in the opposite direction toward a second or orifice-opening position when acted upon by pressurized fuel. Valve needle 76 may also include a hydraulic surface 106 located at a base end of valve needle 76 to drive valve needle 76 with the bias of the valve needle spring toward an orifice-blocking position when acted upon by pressurized fuel. When both hydraulic surfaces 105 and 106 are exposed to substantially the same fluid pressures, the force exerted by the valve needle spring on valve needle 76 may be sufficient to move valve needle 76 to and hold valve needle 76 in the orifice-blocking position.

Spill valve 68 may be disposed between fluid passageways 92 and 94 and configured to selectively allow fuel displaced from bore 74 to flow through fluid passageway 92 to supply/return line 88 where the pressurized fuel may exit fuel injector 32. Specifically, spill valve 68 may include a valve element 110 connected to first electrical actuator 64. Valve element 110 may have a region of enlarged diameter 110a, which is engageable with a valve seat 112 to selectively block the flow of pressurized fuel from fluid passageway 94 to fluid passageway 92. Movement of region 110a away from valve seat 112 may allow the pressurized fuel to flow from fluid passageway 94 to fluid passageway 92 and exit fuel injector 32 via supply/return line 88. When fuel forced from bore 74 is allowed to exit fuel injector 32 via supply/return line 88, the buildup of pressure within fuel injector 32 due to inward displacement of plunger 72 may be minimal. However, when the fuel is blocked from supply/return line 88, the displacement of fuel from bore 74 may result in an increase of pressure within fuel injector 32. Spill valve spring 70 may be situated to bias spill valve 68 toward the flow passing position.

First electrical actuator 64 may include a solenoid 114 and armature 116 for controlling motion of spill valve 68. In particular, solenoid 114 may include windings of a suitable shape through which current may flow to establish a magnetic field such that, when energized, armature 116 may be drawn toward solenoid 114. Armature 116 may be fixedly connected to valve element 110 to move region 110a of valve element 110 against the bias of spill valve spring 70 and into engagement with valve seat 112.

DOC valve 80 may be disposed between fluid passageway 98 and control chamber 90, and configured to selectively block fuel displaced from bore 74 from flowing to control chamber 90, thereby facilitating fuel injection through orifice 104. Specifically, DOC valve 80 may include a valve element 118 connected to second electrical actuator 66. Valve element 118 may have a region of enlarged diameter 118a, which is engageable with a valve seat 120 to selectively block the flow of pressurized fuel from control chamber 90. When the pressurized fuel from fluid passageway 98 is blocked from control chamber 90, an imbalance of force on valve needle 76 may be generated that causes valve needle 76 to move against the spring bias toward the flow-passing position. Disengagement of region 118a from valve seat 120 may allow the pressurized fuel to flow from fluid passageway 98 into control chamber 90, the influx of pressurized fluid thereby returning valve needle 76 to the injection-blocking position. DOC spring 82 may be situated to bias DOC valve 80 toward the flow passing position.

Second electrical actuator 66 may include a solenoid 122 and armature 124 for controlling motion of DOC valve 80. In particular, solenoid 122 may include windings of a suitable shape through which current may flow to establish a magnetic field such that, when energized, armature 124 may be drawn toward solenoid 122. Armature 124 may be fixedly connected to valve element 118 to move region 118a of valve element 118 against the bias of DOC spring 82 and into engagement with valve seat 120.

Figure 3:
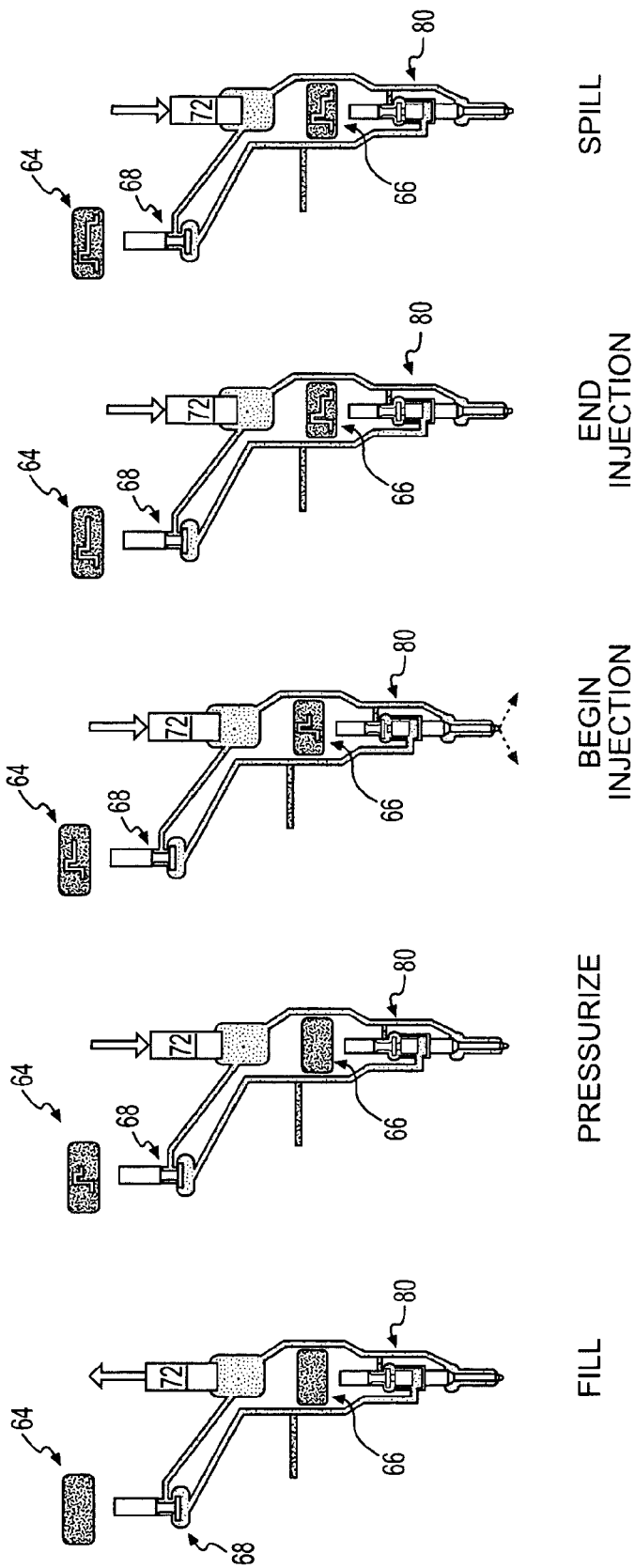
FIGS. 3A-3E are circuit diagrams for the fuel injector of FIG. 2.

In use, starting from the position illustrated in FIG. 3A, fuel injector 32 may fill with fuel when both of first and second electronic actuators 64, 66 are de-energized. In particular, as lobe 56 rotates away from rocker arm 58, plunger spring 75 may urge plunger 72 upward out of bore 74. The outward motion of plunger 72 from bore 74 may act to draw fuel from supply/return line 88 into bore 74 via fluid passageway 92, de-energized spill valve 68, and fluid passageway 94. During the filling operation of fuel injector 32, the forces caused by fluid pressures acting on the hydraulic surfaces of valve needle 76 may be substantially balanced, allowing for the valve needle spring to hold valve needle 76 in the orifice blocking position.

To pressurize the fuel within fuel injector 32, lobe 56 may rotate into engagement with rocker arm 58 to drive plunger 72 into bore 74, thereby displacing fuel from bore 74. If valve element 110 of spill valve 68 remains in the de-energized flow-passing position of FIG. 3A, the fuel displaced by plunger 72 may flow back through fluid passageways 94 and 92 to exit fuel injector 32 via supply/return line 88 without a substantial increase in pressure. However, if valve element 110 of spill valve is moved to the energized flow-blocking position during inward movement of plunger 72, as illustrated in FIG. 3B, the fuel displaced from bore 74 may be blocked from exiting fuel injector 32, thereby causing the pressure within fuel injector 32 to increase in proportion to the displacement of plunger 72. In order to prevent injection during pressurizing of the fuel within fuel injector 32, valve element 118 of DOC valve 80 may remain in the de-energized flow passing position to allow the buildup of pressure acting on hydraulic surface 106 to counteract the buildup of pressure acting on hydraulic surface 105, thereby allowing the valve needle spring to retain valve needle 76 in the orifice-blocking position.

When injection is desired, second electrical actuator 66 may be energized to draw valve element 118 of DOC valve 80 into engagement with valve seat 120, as illustrated in FIG. 3C. In this energized state, the fuel pressurized by the inward movement of plunger 72 may be blocked from hydraulic surface 106, but allowed to remain in contact with hydraulic surface 105. After valve element 118 moves to the flow-blocking position, the pressure of the fuel within control chamber 90 may be lower than the pressure of the fuel acting against hydraulic surface 105. The imbalance of force created by the pressure differential on the hydraulic surfaces of valve needle 76 may act to move valve needle 76 against the bias of the valve needle spring, thereby opening orifice 104 and initiating injection of the pressurized fuel into combustion chamber 22. The time at which valve needle 76 moves away from orifice 104 may correspond to the start of injection timing of fuel injector 32. The displacement of plunger 72 that occurs after valve element 110 has moved to the flow-blocking position and before valve element 118 of DOC valve 80 has moved to the flow-blocking position may correspond to the pressure of the fuel at the start of injection.

To end injection, second electrical actuator 66 may be de-energized to allow valve element 118 of DOC valve 80 to return to the flow-passing position under the bias of DOC spring 82, as illustrated in FIG. 3D. As valve element 118 moves to the de-energized flow-passing position, high pressure fuel may be reintroduced into control chamber 90, thereby allowing the valve needle spring to urge valve needle 76 to the orifice-blocking position. As valve needle 76 reaches the orifice-blocking position, the injection of fuel into combustion chamber 22 may terminate. The displacement of plunger 72 that occurs after valve needle 76 has moved to the flow-passing position and before valve needle 76 returns to the flow-blocking position may correspond to the amount of fuel injected into combustion chamber 22. The time at which valve needle 76 returns to the orifice-blocking position may correspond to the EOI timing of fuel injector 32. The EOI pressure may be a function of plunger velocity and the opening area of orifice 104.

As illustrated in FIG. 3E, almost immediately following the movement of valve element 118 to the flow-passing position, valve element 110 may likewise be moved to the flow-passing position to relieve the pressure of the fuel within fuel injector 32 and reduce the load on low pressure source 36. It is contemplated that if a particular end of injection pressure is desired, valve element 110 may be moved to the flow passing position at a predetermined plunger displacement distance before valve element 118 is moved to the flow passing position to vary (i.e., reduce) the pressure of the fuel discharged through orifice 104.

A time lag may be associated with each of spill valve 68, DOC valve 80, and valve needle 76 between the time that current is applied to or removed from the windings of solenoids 114 and 122, and the time that the respective valve elements actually begin to move or reach their fully closed or open positions. Controller 53 may be configured to determine and apply a delay offset that accounts for this delay when closing or opening spill valve 68 and DOC valve 80.

Figure 4:
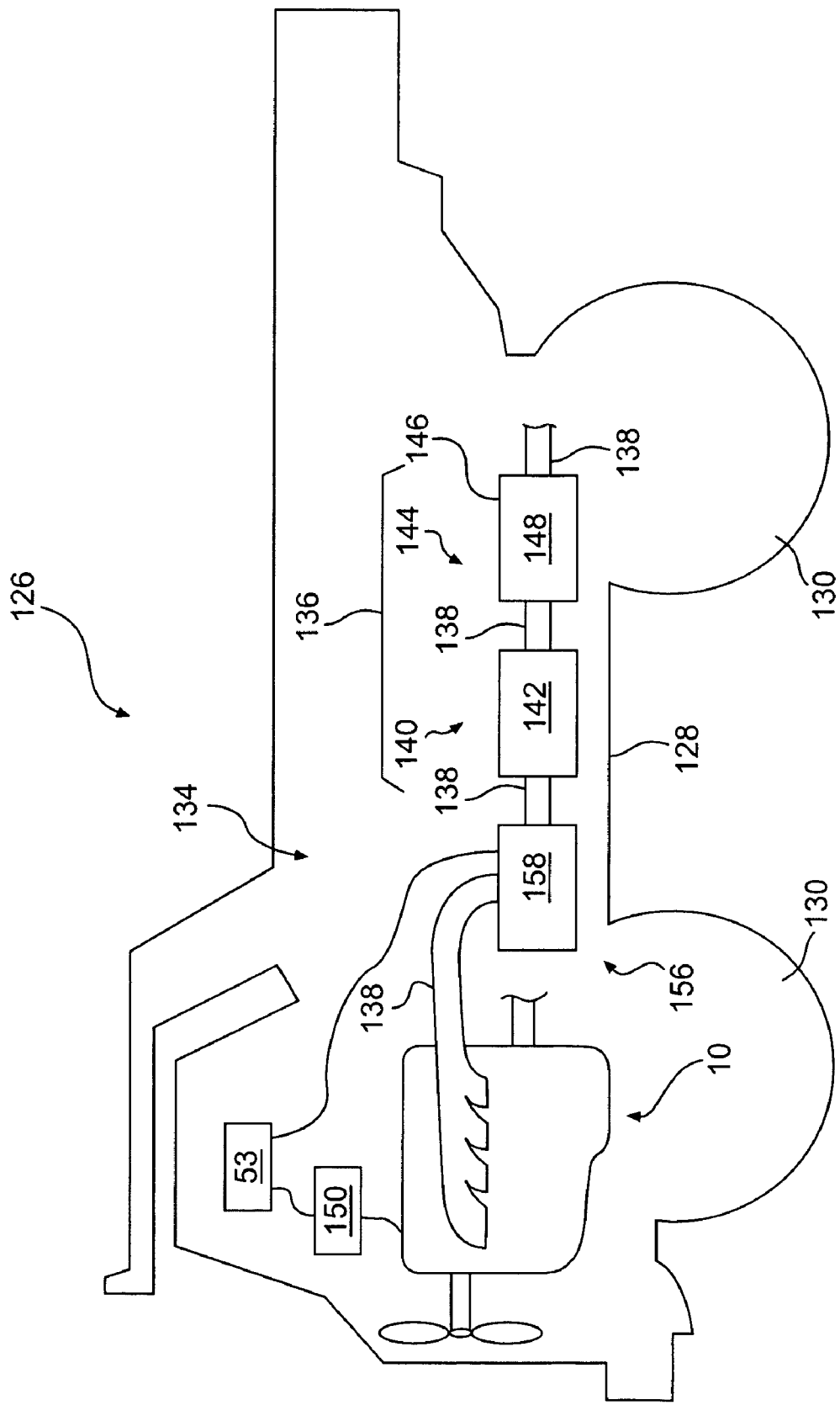
FIG. 4 is a diagrammatic illustration of a work machine according to an exemplary disclosed embodiment.

FIG. 4 illustrates a work machine 126. Work machine 126 may include a frame 128, one or more traction devices 130, engine 10, and a parasitic load control system 134, including controller 53.

Although work machine 126 is shown as a truck, work machine 126 could be any type of machine having an exhaust producing engine. Accordingly, traction devices 130 may be any type of traction devices, such as, for example, wheels, as shown in FIG. 4, tracks, belts, or any combinations thereof.

System 134 may be configured to facilitate operation of an after-treatment device 136. After-treatment device 136 may be any type of device configured to remove one or more constituents from the exhaust gases produced by engine 10 and flowing through an exhaust conduit 138 configured to direct all or a portion of the exhaust gases produced by engine 10 to after-treatment device 136.

System 134 may be configured to facilitate operation of after-treatment device 136 by increasing temperatures of exhaust produced by engine 10. Increasing temperatures of the exhaust may facilitate operation of after-treatment device 136 by increasing the temperature of after-treatment device 136.

The temperature of after-treatment device 136 may be increased by transferring heat to after-treatment device 136 from the exhaust gases with elevated temperatures that are directed to flow through after-treatment device 136. System 134 may be configured to operate engine 10 in a manner that produces exhaust gases with higher temperatures. For example, running engine 10 with a "richer" air/fuel mixture may increase exhaust gas temperature. Increases in engine load may also increase exhaust gas temperature.

In certain embodiments, after-treatment device 136 may include a catalytic converter 140, the operation of which may be facilitated by system 134.

Catalytic converter 140 may include at least one catalytic material 142. In some embodiments, catalytic material 142 may be, for example, an oxidation catalyst configured to oxidize various compounds in the exhaust to thereby remove such compounds from the exhaust. In other embodiments, catalytic material 142 may be, for example, a reduction catalyst configured to reduce various compounds in the exhaust to thereby remove such compounds from the exhaust. Catalytic converter 140 may operate with a higher conversion efficiency when catalytic material 142 is at higher temperatures. Therefore, system 134 may be configured to facilitate operation of after-treatment device 136 by increasing temperatures of exhaust gases, which may increase temperatures of catalytic material 142 due to a heat exchange between the exhaust gases and catalytic material 142.

After-treatment device 136 may also include any type of device that may be regenerated (i.e. reducing an amount of particulate matter accumulated in the after-treatment device) by heat or some other measure. For example, after-treatment device 136 may include a particulate trap 144.

Particulate trap 144 may be configured to remove one or more types of particulate matter from the exhaust gases produced by engine 10. Particulate trap 144 may include an outer housing 146, which may encase a filter material 148 (e.g., a metal mesh) for trapping particulate matter. Particulate trap 144 may be thermally regenerated by raising the temperature of particulate trap 144 above a "light-off" temperature, i.e., the ignition temperature of particulate matter accumulated in particulate trap 144. Thus, at temperatures above the light-off temperature at least some of the particulate matter may be burned off.

After-treatment device 136 may include combinations of these devices. For example, after-treatment device 136 may include a particulate trap and catalytic converter in series, as shown in FIG. 4. In some embodiments, catalytic converter 140 and particulate trap 144 may be integrated into the same unit (e.g., in the same housing). Particulate trap 144 may also be catalyzed, thus being configured to perform the functions of both catalytic converter 140 and particulate trap 144.

Figure 5:
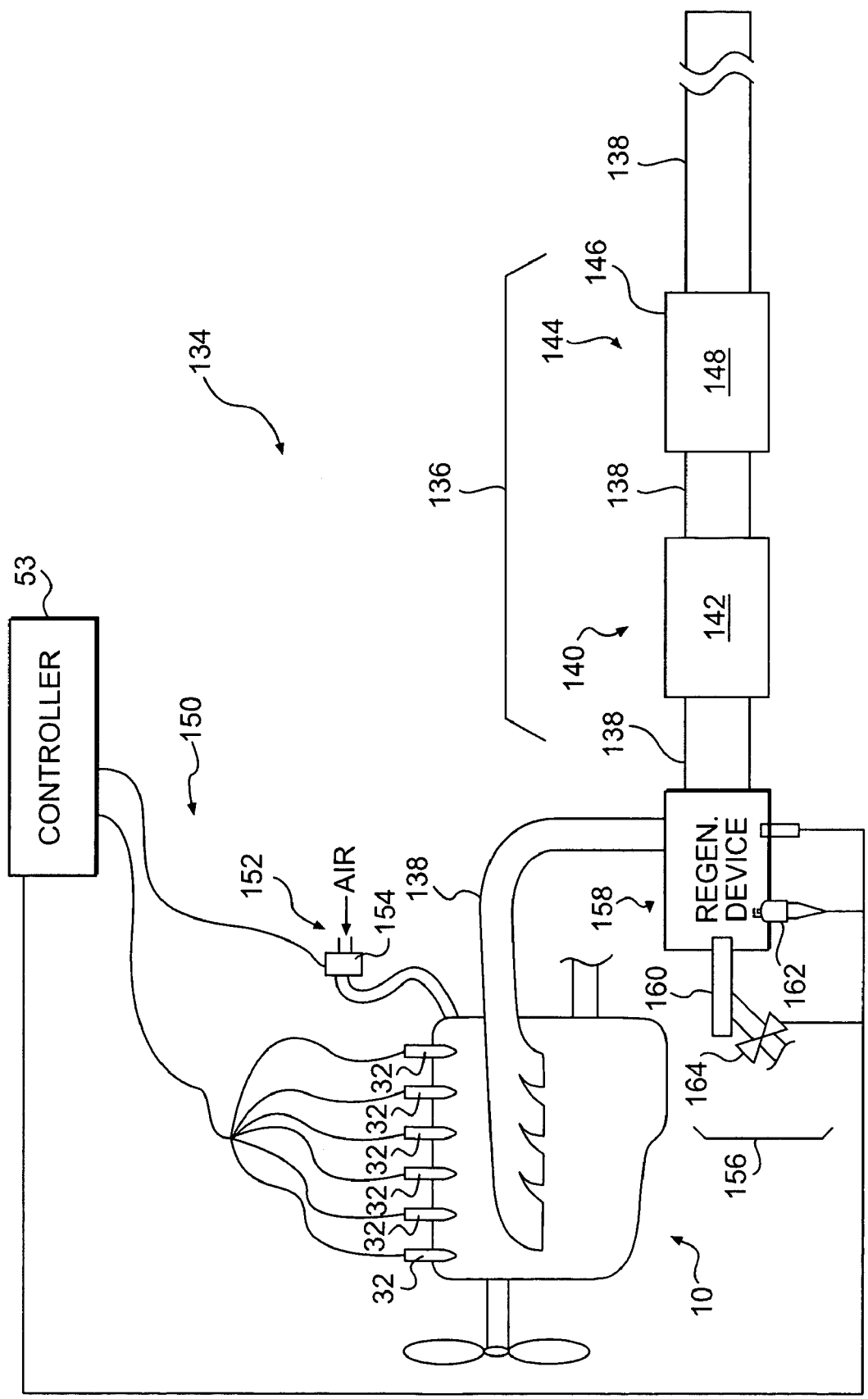
FIG. 5 is a diagrammatic illustration of a parasitic load control system according to an exemplary disclosed embodiment.

System 134 may include parasitic load equipment 150 configured to increase and control parasitic load on engine 10. FIG. 5 illustrates an exemplary embodiment of system 134. Parasitic load equipment 150 may include a fuel pumping mechanism, a pressure chamber, a fuel spill valve, and an injection valve, all of which may be embodied by fuel injectors 32 and have been illustrated as such. In particular, each of fuel injectors 32 may include camshaft-driven plungers 72, which may serve as fuel pumping mechanisms and may be configured to pump fuel to pressurize pressure chambers such as control chamber 90 and pressure chamber 102 within fuel injectors 32. In embodiments having hydraulically actuated injectors, such plungers may be driven by hydraulic pressure. With further regard to mechanically actuated fuel injectors, fuel injectors 32 may each include spill valves 68 to control pressure within the injector and DOC valves 80 to control injection. In addition, parasitic load equipment 150 may include an air intake 152 and an air intake throttle 154.

Controller 53 may be configured to independently regulate the pressure in the pressure chamber and the injection of fuel into the one or more combustion chambers to increase a load on the fuel pumping mechanism. Increased load on the fuel pumping mechanism may cause an increase in parasitic load on the engine, thereby increasing a temperature of the exhaust produced by the engine.

In some embodiments, system 134 may be configured to increase the load on the fuel pumping mechanism by creating pressure in the pressure chamber in excess of pressure used for the injection of fuel into combustion chambers 22. For example, this type of excess pressure may be used to create increased parasitic loading with common rail type fuel injection systems. Alternatively, or additionally, system 134 may be configured to increase the load on the fuel pumping mechanism by creating pressure in the pressure chamber more frequently than is used for the injection of fuel into combustion chambers 22. For example, this type of pressurization with increased frequency may be used to create increased parasitic loading with mechanically and/or hydraulically actuated electronic unit injector type systems. It should also be noted that in addition to or as an alternative to creating pressure with increased frequency, such unit injector systems may be configured to create pressure in excess of the pressure used for the injection of fuel as described above.

In order to increase parasitic load on engine 10, spill valve 68 may be closed and DOC valve 80 may be left open to build pressure in fuel injectors 32 even when injection into combustion chamber 22 of engine 10 is not desired.

When pressure is building within fuel injectors 32, more power may be required to continue pumping fuel against the building pressure. Under such conditions, parasitic load on engine 10 may be increased as more of the power produced by engine 10 must be used to drive the fuel pumping mechanism (i.e., camshaft-driven plunger 72). Once fuel has been pressurized in fuel injector 32, spill valve 68 may be opened to relieve the pressure by releasing the fuel to a location separate from the combustion chambers of the engine, e.g., back through supply/return line 88. When fuel is desired to be injected into combustion chamber 22, DOC valve 80 may be closed, allowing pressure to drop within control chamber 90, thereby allowing pressure within pressure chamber 102 to overcome resistance of the needle valve spring and/or any residual pressure within control chamber 90 and push valve needle 76 into the flow-passing position.

In one embodiment, system 134 may, via controller 53, be configured to pressurize the fuel in fuel injectors 32 and relieve that pressure via spill valve 68 several times per engine cycle, while injecting the fuel into the combustion chambers during only one of those times. For example, system 134 may be configured to pressurize the fuel in fuel injectors 32 five times per engine cycle, in which case the pressure may be relieved via spill valve 68 four times and injected into the combustion chambers once for each engine cycle. System 134 may be configured to execute any number of pressure builds and/or injections during each engine cycle. For purposes of this disclosure, an engine cycle shall refer to the completion of one combustion cycle of a cylinder, i.e., from air intake to exhaust expulsion.

This use of fuel injectors 32 to increase parasitic load on engine 10 may result in increased exhaust temperatures, in part, because controller 53 may be configured to operate engine 10 under increased parasitic load at substantially the same engine speed (or increased slightly) as when not under increased parasitic load and all other conditions are the same.

In order to maintain engine speed under increased parasitic load, system 134 may be configured to supply engine 10 with a richer air/fuel mixture under such conditions. Doing so may increase the temperature of the exhaust gases produced by engine 10.

Thermal regeneration may be performed periodically or continually. In embodiments that employ periodic regeneration, certain conditions may trigger a regeneration event. For example, regeneration events may be executed at predetermined time intervals (e.g., time of engine operation). Regeneration events may also be triggered by conditions detected by one or more types of monitoring equipment. For example, backpressure upstream from particulate trap 144 may indicate accumulation of particulate matter within particulate trap 144. When this backpressure reaches a predetermined threshold value, a regeneration event may be triggered. Regeneration events may be triggered by any number of different types of conditions.

This use of fuel injectors 32 to increase parasitic load on engine 10 may be the sole means for regeneration or may be executed in conjunction with other methods for facilitating regeneration. Accordingly, other means for elevating exhaust gas temperatures may be included in system 134. For example, in addition to using fuel injectors 32 to increase parasitic load on engine 10, exhaust gas temperatures may be elevated by means for facilitating such techniques as, for example, air inlet throttling, i.e., regulation of air intake throttle 154 resulting in a reduction in air intake, causing a richer air/fuel mixture. Exhaust gases may also be heated by post-injection. Post-injection is the process of injecting additional fuel into the combustion chambers after the combustion has taken place, which may result in the additional fuel being burned in the exhaust system, thereby elevating the temperature of the exhaust gases in the exhaust system. Such diverse means of elevating exhaust temperatures may be operated in concert with one another. For example, fuel injectors 32 may be used to generate increased parasitic load on engine 10 to increase exhaust temperature in support of air intake throttling. That is, two or more means of producing exhaust gases with increased temperatures may work together to achieve the desired exhaust temperatures.

This use of fuel injectors 32 to increase parasitic load on engine 10 may also be executed in conjunction with operation of a regeneration device 156 configured to reduce an amount of particulate matter in after-treatment device 136. For example, regeneration device 156 may include a burner assembly 158 configured to increase the temperature of the exhaust gases flowing through exhaust conduit 138 upstream from after-treatment device 136. Burner assembly 158 may be configured to maintain or restore, at least in part, the performance of after-treatment device 136 through thermal regeneration. Accumulation of exhaust flow constituents in after-treatment device 136 may result in a decline in engine performance and/or possible damage to after-treatment device 136 and/or other components of system 134. Burner assembly 158 may be configured to prevent or restore any decline in engine performance and avoid possible damage to after-treatment device 136 and/or other components of system 134. For example, burner assembly 158 may be configured to cause at least some of the particulate matter that may have accumulated in after-treatment device 136 to be burned off.

Although system 134 is shown with a single after-treatment device 136 and a single regeneration device 156, system 134 may include more than one after-treatment device 136 and/or more than one regeneration device 156. For example, in one embodiment, system 134 may include a single regeneration device 156 configured to regenerate two after-treatment devices. In another embodiment, system 134 may include two regeneration devices configured to regenerate two after-treatment devices. In such an embodiment, each regeneration device may be configured to regenerate one of the after-treatment devices or contribute to the regeneration of both of the after-treatment devices. System 134 could also include any number of regeneration devices and/or after-treatment devices in any combination suitable for regeneration.

For purposes of the following explanation, after-treatment device 136 will be discussed as being particulate trap 144, while regeneration device 156 will be discussed as being burner assembly 158. However, it should be noted that after-treatment device 136 and regeneration device 156 could be any of the disclosed types of after-treatment and regeneration devices mentioned above.

Burner assembly 158 may be positioned anywhere along exhaust conduit 138 between engine 10 and particulate trap 144. Burner assembly 158 may include a burner fuel injector 160 configured to supply fuel to burner assembly 158. Burner assembly 158 may be configured to create a flame, which may be in a heat exchange relationship with the exhaust flow. System 134 may be configured to supply burner fuel injector 160 with fresh air for mixing with the fuel for combustion, as well as for flushing burner fuel injector 160 of any fuel or debris before and/or after operation of burner assembly 158.

System 134 may be configured to supply fresh air to burner fuel injector 160, to be mixed with fuel for combustion in burner assembly 158. Burner assembly 158 may also include a spark plug 162 configured to provide spark to ignite the air/fuel mixture delivered by burner fuel injector 160. Operation of spark plug 162 may be controllable by controller 53. Although burner assembly 158 has been shown and described as including spark plug 162, alternative ignition sources may be employed, such as, for example, glow plugs or any other means for igniting an air/fuel mixture.

System 134 may be configured to control one or more additional system functions and/or parameters. Controller 53 may be configured to control a fuel on/off valve 164, which may be associated with burner fuel injector 160 to selectively allow fuel to be delivered to burner fuel injector 160. In addition to fuel on/off valve 164, system 134 may also include a fuel pressure regulator valve (not shown) controllable by controller 53 to regulate the pressure of the fuel, and thereby the rate at which fuel is delivered to burner fuel injector 160.

Controller 53 may be further configured to control other types of regeneration devices or methods. For example, the amount of post-injection may be varied (e.g., by controller 53) to control the temperature of the exhaust gases entering any kind of after-treatment device 136.

Although system 134 has been described as it applies to engines that employ mechanical electronic unit injectors (e.g., fuel injectors 32), system 134 could also apply to other types of fuel systems, such as, for example, common rail systems, which also include fuel pumping mechanisms. In a common rail system a spill valve and injector valve may be utilized to regulate the pressurization of fuel and release of pressurized fuel in much the same way as spill valve 68 and DOC valve 80 described above. Increased parasitic load may be created by causing the fuel pump to work harder than would be required to simply inject fuel into the combustion chambers of an engine.

FIGS. 6A-6D illustrate exemplary data for several operating parameters of system 134 over the course of a partial engine cycle while system 134 is being operated to increase parasitic load on engine 10. FIGS. 6A-6D will be discussed in detail below.

INDUSTRIAL APPLICABILITY

The disclosed parasitic load control system 134 may be suitable to enhance exhaust emissions control for engines. System 134 may be used for any application of an engine. The disclosed system may be applicable to mobile equipment, such as vehicles. The disclosed system may be used for any kind of vehicle. For example, the disclosed system may be used for automobiles, work machines (including those for on-road, as well as off-road use), and other heavy equipment.

The disclosed system may also be applicable to stationary equipment, such as power generation sets. The disclosed system may be configured to place increased parasitic load on an engine by controlling the operation of a fuel pump, which may be present in any engine application, including stationary equipment, for purposes of delivering fuel to the engine.

Therefore, an advantage of the disclosed system is that it does not rely on auxiliary devices, such as air conditioning units (as do some prior art systems), which are not required for operation of the engine, and, therefore, may not be applicable to such a wide variety of equipment. In particular, air conditioning would not be applicable to unmanned equipment, such as power generation sets.

By increasing parasitic load on the engine and thereby generating exhaust having higher temperatures, the disclosed system may facilitate operation of many different types of after-treatment devices. For example, the disclosed system may facilitate operation of various types of catalytic converters by increasing the operating temperature of the catalytic material of the catalytic converters.

One application of the disclosed system may be to facilitate operation of a $NO_x$ adsorber catalytic converter, which may be configured to remove nitrogen oxides (e.g., NO, $NO_2$ or $N_2O$; often referred to collectively as "$NO_x$") from exhaust. Such use may be particularly applicable under certain engine operating conditions (e.g., cold start, idle, low load, etc.) that may produce low exhaust temperatures. By increasing the temperature of exhaust during such operating conditions, the disclosed system may enhance the ability of a $NO_x$ adsorber catalyst to store $NO_x$.

Another application of the disclosed system may be to facilitate operation of an oxidation catalyst. The disclosed system may be used to increase exhaust temperatures, which may increase the temperature of the catalytic material of the oxidation catalyst. By doing so, the catalytic converter may achieve increased conversion efficiency. In addition, increasing temperatures of the catalytic material may enable a catalytic converter to more efficiently oxidize fuel in the exhaust stream (e.g., fuel added via post-injection or in-pipe injection). The oxidation of this fuel over the catalytic material may further increase exhaust temperatures and thereby facilitate regeneration of an after-treatment device, such as a particulate trap. Further, regeneration of a particulate trap may also be facilitated by the disclosed system by increasing exhaust temperatures without utilizing an oxidation catalyst to further increase exhaust temperatures.

Increasing exhaust temperatures as disclosed herein may also be used to support other types of after-treatments, such as selective catalytic reduction (SCR). SCR may include the selective reduction of exhaust constituents, such as $NO_x$, in the presence of gaseous oxygen and a reducing agent. The reducing agent may be either inorganic (e.g., ammonia), or organic, such as hydrocarbons, oxygenated hydrocarbons (e.g., methanol), or nitrogen-containing chemicals (e.g., urea). This selective reduction may take place over a catalyst. Therefore, the operating temperature of the catalyst may have some effect on the efficacy of the reduction. For example, the catalytic reduction reaction may achieve a higher conversion efficiency if the catalyst is at a higher temperature. Under certain engine operating conditions exhaust temperatures may be lower than under other operating conditions (e.g., high loads and/or engine speed). In order to support efficient SCR, the presently disclosed system may be utilized to raise exhaust temperatures. Although, the disclosed system may be utilized to raise exhaust temperatures under any engine operating conditions, a particular application may be during engine operating conditions under which the engine produces lower exhaust temperatures (e.g., cold start, idle, low load, etc.).

The disclosed system may employ any type of fuel injection system capable of independently controlling pressure and injection of fuel. Such fuel injection systems may include common rail systems, hydraulically actuated electronic unit injectors, mechanically actuated electronic unit injectors, or any other type of suitable system.

FIGS. 6A-6D show data that is illustrative of execution of an exemplary control strategy for operation of system 134. FIGS. 6A-6D each show a graph of a particular operating parameter associated with operation of system 134. Each graph includes data for these parameters over the course of a partial engine cycle as measured by degrees of crank rotation ("crank angle"). The illustrated control strategy includes building excess fuel pressure over a first time period, releasing the pressure via spill valve 68, building pressure over a subsequent time period, injecting fuel into the combustion chamber after the second time period, building still more pressure over a third time period, and releasing the pressure again via spill valve 68.

Figure 6A:
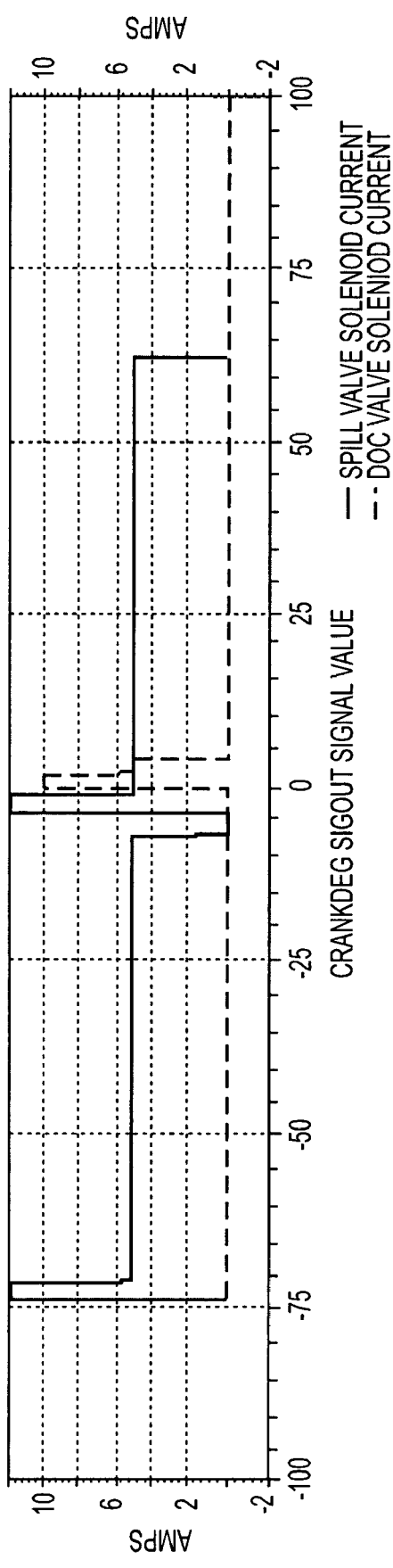
FIGS. 6A-6D are graphs of exemplary operating parameter data for the disclosed system according to an exemplary disclosed embodiment.

FIG. 6A shows electric current corresponding to control signals used to actuate spill valve 68 and DOC valve 80. At around −75 degrees of crank rotation, a marked increase is shown in current delivered to solenoid 114 associated with spill valve 68. This current may actuate spill valve 68 to close causing pressure to build within fuel injector 32. After 5-10 degrees of additional crank rotation, this current may drop to a level roughly half of the initial current because a reduced current may be used to maintain spill valve 68 in the closed position once valve element 110 of spill valve 68 is initially moved into the closed position using a higher initial current. At around −10 degrees of crank rotation, the current level may be zero or nearly zero, such that spill valve 68 may be opened to allow release of the pressure that was built up between −75 and −10 degrees of crank rotation.

A similar spill valve current signal is indicated starting at about −5 degrees of crank rotation with the closing of spill valve 68 being shown at around 62 degrees of crank rotation. Also overlaid in FIG. 6a is a graph of current delivered to the solenoid associated with DOC valve 80. At zero degrees of crank rotation, a jump in current indicates the actuation of DOC valve 80 to thereby close DOC valve 80 allowing the injection of pressurized fuel into the combustion chamber via valve needle 76.

Figure 6B:
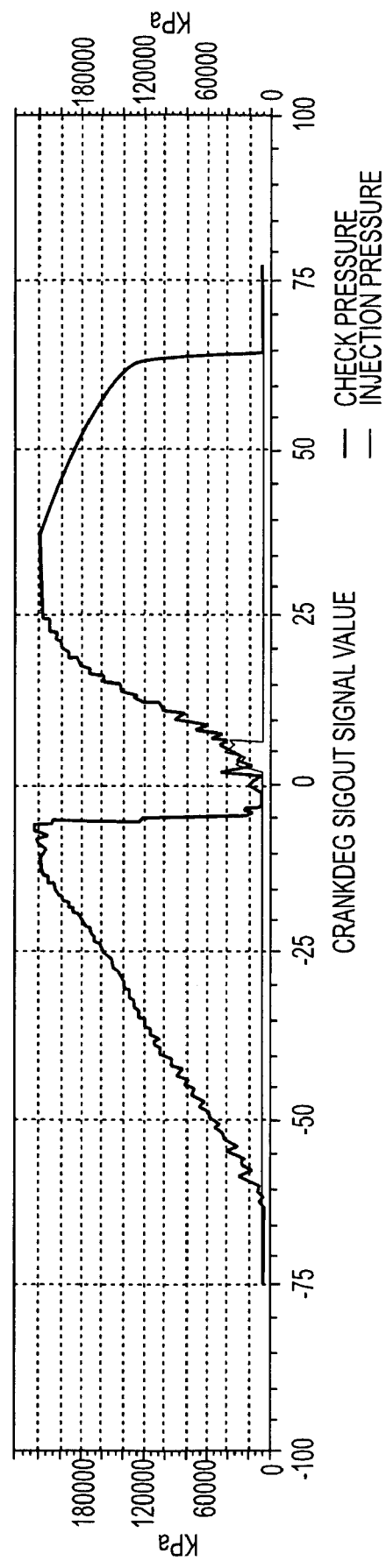

FIG. 6B indicates the pressure building within fuel injector 32.

Figure 6C:
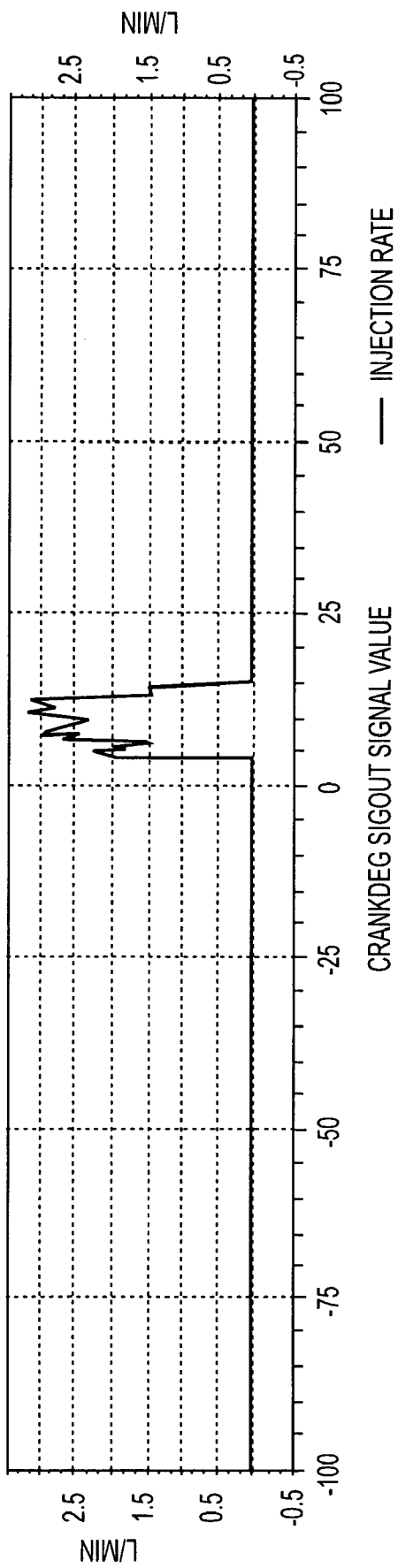

The first ramp illustrates the initial pressure build following the actuation of spill valve 68 at −75 degrees of crank rotation. The rapid pressure drop at about −5 degrees of crank rotation coincides with the opening of spill valve 68 as shown in FIG. 6A. At about zero degrees of crank rotation, pressure within fuel injector 32 begins to build again, as well as injection pressure. At about 2.5 degrees of crank rotation, a slight drop in both pressures is shown, which corresponds with the closing of DOC valve 80, as shown in FIG. 6A, to allow injection of the pressurized fuel. At about 5 degrees of crank rotation, injection pressure drops off as the injection is terminated, but the pressure within fuel injector 32 continues to build and remains in excess of the maximum injection pressure reached until spill valve 68 is opened at about 62 degrees of crank rotation, as shown in FIG. 6A. It should also be noted, that not only may pressure be allowed to build more frequently than needed for injection, the pressure may be allowed to build to higher levels than needed for injection as illustrated by the higher peaks of the pressure build curves as compared to the injection pressure curve in FIG. 6B. FIG. 6C shows the rate of injection of the fuel as it is released due to the closing of DOC valve 80 between about 2 degrees and 6 degrees of crank rotation.

Figure 6D:
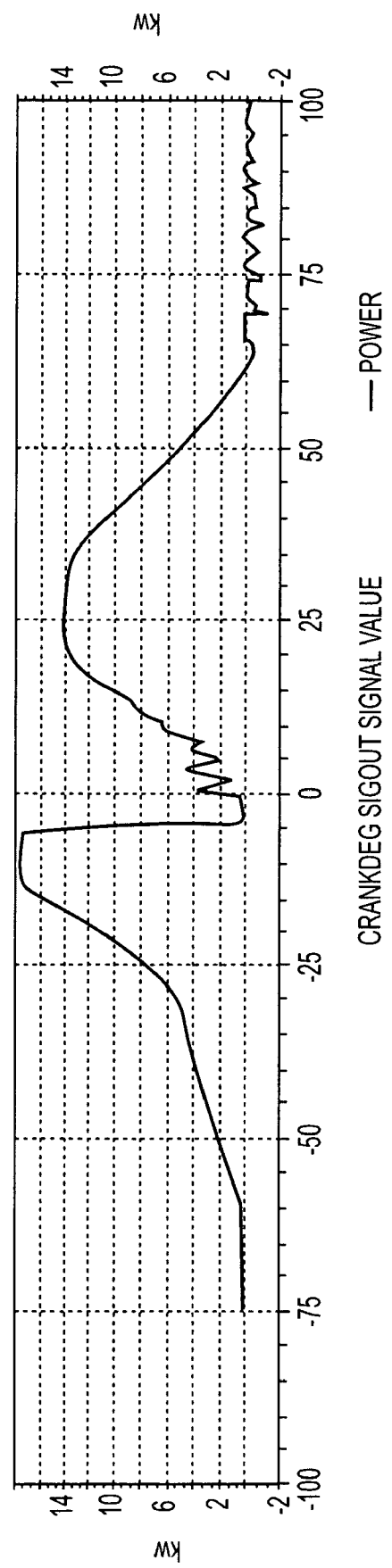

FIG. 6D shows the parasitic loading on engine 10 due to operation of fuel injector 32 in the manner discussed with regard to FIGS. 6A-6C. The parasitic loading curve resembles the check pressure curve in FIG. 6B because more power is required from engine 10 by fuel injector 32 to pump fuel against the building pressure. That is, the higher the pressure in fuel injector 32, the more power needed from engine 10 to operate fuel injector 32. In order to meet this increased power demand, engine 10 may increase the amount of fuel in the air/fuel mixture, which may increase exhaust temperatures.

An exemplary method of using the disclosed system may include the step of positioning spill valve 68 in a first position, thereby allowing accumulation of an amount of pressurized fuel within fuel injector 32. This step may facilitate increasing parasitic load on engine 10, resulting in an increase in temperature of the exhaust produced by engine 10. The method may also include positioning spill valve 68 in a second position to drain off the pressurized fuel to a location separate from combustion chambers 22 of engine 10.

The method may further include thermally regenerating after-treatment device 136 (e.g., particulate trap 144) by utilizing exhaust that has undergone the increase in temperature, thereby reducing an amount of particulate matter accumulated in after-treatment device 136. The method may also include operating engine 10 under increased parasitic load at substantially the same engine speed as when not under increased parasitic load and all other conditions are the same.

Additionally, the method may include raising the temperature of the exhaust using one or more additional methods besides the increasing of load on fuel pump 32. Such methods may include at least one of air inlet throttling, post-injection, increasing backpressure upstream from after-treatment device 136, air inlet heating, operating an electrical heating element, and operating a burner assembly 158 positioned upstream from after-treatment device 136 and configured to produce a flame and direct the exhaust in heat exchange relation to the flame.

It will be apparent to those having ordinary skill in the art that various modifications and variations can be made to the disclosed parasitic load control system without departing from the scope of the invention. Other embodiments of the invention will be apparent to those having ordinary skill in the art from consideration of the specification and practice of the invention disclosed herein. It is intended that the specification and examples be considered as exemplary only, with a true scope of the invention being indicated by the following claims and their equivalents.

What is claimed is:

1. A parasitic load control system, comprising:
an exhaust producing engine;
a fuel pumping mechanism configured to pressurize fuel in a pressure chamber;
an injection valve configured to cause fuel pressure to build within the pressure chamber when in a first position and allow injection of fuel from the pressure chamber into one or more combustion chambers of the engine when in a second position; and
a controller configured to independently regulate the pressure in the pressure chamber and the injection of fuel into the one or more combustion chambers, to increase a load on the fuel pumping mechanism, increasing parasitic load on the engine, thereby increasing a temperature of the exhaust produced by the engine.

2. The system of claim 1, wherein the system is configured to increase the load on the fuel pumping mechanism by creating pressure in the pressure chamber in excess of pressure used for the injection of fuel into the one or more combustion chambers.

3. The system of claim 1, wherein the system includes a hydraulically actuated fuel injector.

4. The system of claim 1, wherein the controller is further configured to operate the engine under increased parasitic load at substantially the same engine speed as when not under increased parasitic load and all other conditions are the same.

5. The system of claim 1, wherein the system is configured to increase the load on the fuel pumping mechanism by creating pressure in the pressure chamber more frequently than is used for the injection of fuel into the one or more combustion chambers.

6. The system of claim 5, wherein the system is also configured to increase the load on the fuel pumping mechanism by creating pressure in the pressure chamber in excess of pressure used for the injection of fuel into the one or more combustion chambers.

7. The system of claim 1, wherein the system includes a mechanically actuated fuel injector.

8. The system of claim 7, wherein the controller is configured to position the spill valve in the first position to build pressure and then the second position to relieve at least some of the pressure two or more times during an engine cycle.

9. The system of claim 1, further including:
a spill valve configured to:
cause fuel pressure to build within the pressure chamber when in a first position; and
allow fuel to drain from the pressure chamber when in a second position;
wherein the controller is further configured to:
position the spill valve in the first position and the injection valve in the first position to accumulate an amount of pressurized fuel within the pressure chamber; and
subsequently position the spill valve in the second position to drain off at least a portion of the pressurized fuel to a location separate from the one or more combustion chambers of the engine, thereby relieving at least some of the pressure in the pressure chamber.

10. The system of claim 9, wherein the controller is configured to position the spill valve in the first position to build pressure and then the second position to release the pressurized fuel two or more times during an engine cycle.

11. The system of claim 1, further including an after-treatment device configured to remove one or more constituents from the exhaust produced by the engine, wherein the system is configured such that the increasing of the temperature of the exhaust produced by the engine facilitates operation of the after-treatment device.

12. The system of claim 11, wherein the after-treatment device includes a catalytic material.

13. The system of claim 12, wherein the catalytic material includes an oxidation catalyst.

14. The system of claim 13, wherein the increasing of the temperature of the exhaust produced by the engine facilitates operation of the oxidation catalyst by increasing a temperature of the oxidation catalyst.

15. The system of claim 14, wherein the increasing of the temperature of the oxidation catalyst thereby enables fuel in the exhaust to be oxidized over the oxidation catalyst further increasing the temperature of the exhaust, thereby contributing to thermal regeneration of a particulate trap configured to remove one or more types of particulate matter from the exhaust, wherein thermal regeneration includes reducing an amount of particulate matter accumulated in the particulate trap.

16. The system of claim 12, wherein the after-treatment device includes a reduction catalyst.

17. The system of claim 16, wherein the after-treatment device is configured to provide selective catalytic reduction of one or more constituents in the exhaust.

18. The system of claim 11, wherein the system is further configured to raise the temperature of the exhaust in at least one additional manner including at least one of air inlet throttling, post-injection, increasing backpressure upstream from the after-treatment device, air inlet heating, operating an electrical heating element, and operating a burner assembly positioned upstream from the after-treatment device and configured to produce a flame and direct the exhaust in heat exchange relation to the flame.

19. A method of controlling parasitic load on an exhaust producing engine, comprising:
pressurizing fuel in a pressure chamber; and
independently regulating the pressure in the pressure chamber and the injection of fuel into one or more combustion chambers of the engine to increase a load on a fuel pumping mechanism, increasing parasitic load on the engine, thereby increasing a temperature of the exhaust produced by the engine.

20. The method of claim 19, wherein the increasing of the load on the fuel pumping mechanism is accomplished by creating pressure in the pressure chamber in excess of pressure used for the injection of fuel into the one or more combustion chambers.

21. The method of claim 19, further including hydraulically actuating the fuel pumping mechanism.

22. The method of claim 19, further including mechanically actuating the fuel pumping mechanism.

23. The method of claim 19, further including operating the engine under increased parasitic load at substantially the same engine speed as when not under increased parasitic load and all other conditions are the same.

24. The method of claim 19, wherein the increasing of the load on the fuel pumping mechanism is accomplished by creating pressure in the pressure chamber more frequently than is used for the injection of fuel into the one or more combustion chambers.

25. The method of claim 24, further including creating pressure in the pressure chamber in excess of pressure used for the injection of fuel into the one or more combustion chambers.

26. The method of claim 19, further including draining off at least a portion of the pressurized fuel to a location separate from the one or more combustion chambers of the engine, thereby relieving at least some of the pressure in the pressure chamber.

27. The method of claim 26, including building fuel pressure in the pressure chamber and relieving at least some of the pressure two or more times during an engine cycle.

28. The method of claim 19, further including facilitating operation of an after-treatment device configured to remove one or more constituents from the exhaust produced by the engine.

29. The method of claim 28, wherein the after-treatment device includes a catalytic material.

30. The method of claim 29, wherein operation of the after-treatment device includes an oxidation reaction over the catalytic material.

31. The method of claim 30, wherein the increasing of the temperature of the exhaust produced by the engine facilitates propagation of the oxidation reaction by increasing a temperature of the catalytic material.

32. The method of claim 31, wherein the increasing of the temperature of the catalytic material thereby enables fuel in the exhaust to be oxidized over the catalytic material further increasing the temperature of the exhaust, thereby contributing to thermal regeneration of a particulate trap configured to remove one or more types of particulate matter from the exhaust, wherein thermal regeneration includes reducing an amount of particulate matter accumulated in the particulate trap.

33. The method of claim 28, wherein operation of the after-treatment device includes a reduction reaction over the catalytic material.

34. The method of claim 33, further including providing selective catalytic reduction of one or more constituents in the exhaust.

35. The method of claim 28, further including raising the temperature of the exhaust using one or more additional methods besides the increasing of load on the fuel pumping mechanism, the one or more methods including at least one of air inlet throttling, post-injection, increasing backpressure upstream from the after-treatment device, air inlet heating, operating an electrical heating element, and operating a burner assembly positioned upstream from the after-treatment device and configured to produce a flame and direct the exhaust in heat exchange relation to the flame.

36. A machine, comprising:
a frame;
an exhaust producing engine coupled to the frame;
a fuel pumping mechanism configured to pressurize fuel in a pressure chamber
an injection valve configured to cause fuel pressure to build within the pressure chamber when in a first position and allow injection of fuel from the pressure chamber into one or more combustion chambers of the engine when in a second position; and
a controller configured to independently regulate the pressure in the pressure chamber and the injection of fuel into the one or more combustion chambers, to increase a load on the fuel pumping mechanism, increasing parasitic load on the engine, thereby increasing a temperature of the exhaust produced by the engine; and
a particulate trap configured to remove one or more types of particulate matter from the exhaust produced by the engine, wherein the increasing of the temperature of the exhaust produced by the engine contributes to thermal regeneration of the particulate trap, thereby reducing an amount of particulate matter accumulated in the particulate trap.

37. The machine of claim 36, wherein the system is configured to increase the load on the fuel pumping mechanism by creating pressure in the pressure chamber in excess of pressure used for the injection of fuel into the one or more combustion chambers.

38. The machine of claim 36, wherein the system includes a hydraulically actuated fuel injector.

39. The machine of claim 36, wherein the system includes a mechanically actuated fuel injector.

40. The machine of claim 36, wherein the after-treatment device includes an oxidation catalyst, the increasing of the temperature of the exhaust produced by the engine facilitating operation of the oxidation catalyst by increasing a temperature of the oxidation catalyst; and wherein the increasing of the temperature of the oxidation catalyst thereby enables fuel in the exhaust to be oxidized over the oxidation catalyst further increasing the temperature of the exhaust, thereby contributing to thermal regeneration of the particulate trap.

41. The machine of claim 36, wherein the system is configured to increase the load on the fuel pumping mechanism by creating pressure in the pressure chamber more frequently than is used for the injection of fuel into the one or more combustion chambers.

42. The machine of claim 41, wherein the system is also configured to increase the load on the fuel pumping mechanism by creating pressure in the pressure chamber in excess of pressure used for the injection of fuel into the one or more combustion chambers.

43. The machine of claim 36, further including:

a spill valve configured to:

cause fuel pressure to build within the pressure chamber when in a first position; and allow fuel to drain from the pressure chamber when in a second position;

wherein the controller is further configured to:

position the spill valve in the first position and the injection valve in the first position to accumulate an amount of pressurized fuel within the pressure chamber; and subsequently position the spill valve in the second position to drain off at least a portion of the pressurized fuel to a location separate from the one or more combustion chambers of the engine.

44. The machine of claim 43, wherein the controller is configured to position the spill valve in the first position to build pressure and then the second position to release the pressurized fuel two or more times during an engine cycle.

* * * * *